United States Patent Office

3,110,718
PROCESS FOR PREPARING A 1,2-DITHIOLE-3-THIONE

André Alfred Albert Thuillier, Caen, Calvados, France, assignor to Olivier Gaudin, Neuilly-sur-Seine, Seine, France
No Drawing. Filed May 25, 1959, Ser. No. 815,264
Claims priority, application France June 6, 1958
3 Claims. (Cl. 260—327)

The present invention relates to improvements in the preparation of β-keto-dithiocarboxylic acids and their transformation into substituted 1,2-dithiole-3-thiones.

It is well known to prepare 1,2-dithiole-3-thiones by causing sulfur to react with a compound comprising a three-member carbon chain may be substituted at the central carbon atom and/or at one of the terminal carbon atoms.

The technical literature discloses, however, that a generally low yield is obtained when the following reaction is carried out in an alkaline medium:

R—CO—CH$_2$—R′+CS$_2$→R—CO—CR′=C(SH)$_2$

It is one object of the present invention to increase the yield in a process for preparing β-keto-dithiocarboxylic acids by the condensation of carbon disulfide with a ketone.

I have found unexpectedly that this object may be accomplished by effectuating the condensation in the presence of an alkali metal alcoholate of a tertiary alcohol having four or five carbon atoms.

According to one feature of the invention, the thus obtained β-keto-dithiocarboxylic acids are transformed into the corresponding 1,2-dithiole-3-thiones in a reaction with phosphorus pentasulfide, at a very high yield.

Thus, with readily accessible ketones as a starting material, yields exceeding 60%, on the basis of the starting material, of variously substituted 1,2-dithiole-3-thiones may be obtained. This is far in excess of the yields heretofore obtainable in the preparation of these compounds.

As is known, 1,2-dithiole-3-thiones have the general formula

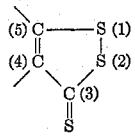

Example I

A mixture of 30 grams of sodium wire in a solution of 750 cc. benzene and 88 grams of tert-amyl alcohol is heated under reflux for about two hours to obtain a benzene solution of sodium tert-amylate. The liquid is decanted from the unreacted sodium at the end of the reaction.

A mixture of 60 grams of acetophenone and 76 grams of carbon disulfide is added and stirred into the cooled amylate solution. A precipitate of the sodium salt of benzoyl-dithio-acetic acid forms immediately. After cooling, water is added and the precipitate is dissolved. The aqueous solution is separated by decanting and is extracted with ether.

The separated aqueous solution of the sodium salt is acidified with dilute, iced sulfuric acid and the free organic acid is extracted with ether. The extract is dried with sodium sulfate and the ether is evaporated. The residue, which crystallizes immediately, is washed with a little petroleum ether which dissolves a small quantity of a red impurity. There is thus obtained 83 grams of benzoyl-dithio-acetic acid as yellow crystals melting at 63° C., which constitutes a yield of 84% with respect to the acetophenone starting material.

This acid, whose structural formula is

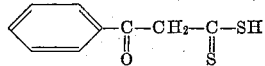

is transformed into the corresponding 5-phenyl-1,2-dithiole-3-thione of the structural formula

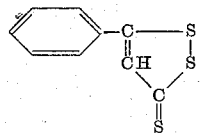

in the following manner:

150 grams of phosphorus pentasulfide are introduced into 750 cc. of dry xylene. This mixture is brought to the boiling point while being vigorously stirred. The 83 grams of the benzoyl-dithio-acetic acid are dissolved in 250 cc. of xylene and this solution is added drop by drop to the mixture. An exothermic reaction immediately takes place and it is necessary to control the temperature of the reaction. The drop-by-drop addition of the acid is made in 30 minutes and heating under reflux is continued for 15 minutes.

After cooling, the dark red xylene solution is decanted and the remaining black residue in the reaction vessel is washed with boiling xylene. The xylene solutions are collected and cooled, whereupon the combined medium is washed with dilute soda and then with water until the medium is neutral.

The neutral xylene solution is now dried with sodium sulfate, filtered and concentrated under reduced pressure. On cooling, the concentrated solution precipitates 66 grams of brown-red crystals of 5-phenyl-1,2-dithiole-3-thione melting at 124°–125° C.

It is possible to extract an additional 3.5 grams of this compound by adding mercuric chloride to the filtered xylene solution. The mercuric precipitate is dried, washed with a little xylene and decomposed by means of an aqueous concentrated solution of sodium sulfide. The free thione is extracted with benzene and the solvent is removed under reduced pressure.

The yield of the sulfuration reaction is 78% and the yield with respect to the starting ketone is 66%.

Example II

A mixture of 29 grams of acetone and 40 grams of carbon disulfide is added to a cold solution of one mol of sodium tert-amylate in 750 cc. of benzene. The sodium salt of acetyl-dithio-acetic acid,

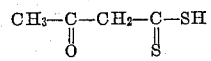

precipitates immediately. The mixture is permitted to react for four hours.

At the end of the reaction, the precipitate is dissolved in water, the red aqueous solution is decanted, washed with ether and then acidified with dilute iced sulfuric acid.

The free acid is then separated as a red oil which is extracted with ether. The ether solution is washed with water, dried and concentrated, 70 grams of a red liquid being obtained as a residue.

This product is dissolved in 250 cc. of xylene and sulfurized in the same manner as in Example I. By cooling the concentrated xylene solution to −5° C., 53 grams of raw crystals are obtained. This product is dissolved in benzene and purified by filtration through a layer of activated alumina. The solvent is then evaporated and there remain 37 grams of brown crystals of 5-methyl-1,2-dithiole-3-thione of the structural formula

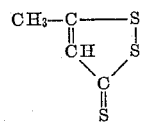

melting at 31°–32° C.

The yield with respect to the acetone starting material is 50%.

Example III 3,3-dimethyl-2-butanone is condensed with carbon disulfide in the presence of sodium tert-amylate according to Example I. In this case, however, the formed sodium salt remains in solution in the benzene. The solution is washed with water and the aqueous solution is acidified. The resultant 4,4-dimethyl-3-oxo-dithio-pentanoic acid

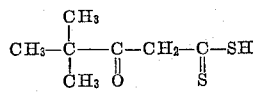

is extracted with ether and, after the ether is distilled off, the acid is sulfurized in accordance with Example II, obtaining brown-yellow crystals of 5-t-butyl-1,2-dithiole-3-thione of the structural formula

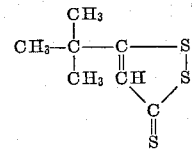

melting at 70° C.

The yield with respect to the starting ketone is 55%.

Example IV 29 grams of tert-amyl alcohol are mixed with 250 cc. of benzene, 12 grams of sodium wire are added to the mixture and the mixture is boiled under reflux for two hours. The mixture is then allowed to cool, the liquid phase is decanted from the excess sodium and the solution is reacted with a mixture of 25 grams of p-methoxy-acetophenone and 25 grams of carbon disulfide. The sodium salt of p-methoxyl-benzoyl-dithio-acetic acid precipitates and, after several hours, this acid is isolated according to the procedure of Example I, 31.5 grams of red crystals (yield: 84%) melting at 98° C. being obtained.

17 grams of the above acid are dissolved in 100 cc. of xylene and added in small amounts to 50 grams of phosphorus pentasulfide dissolved in 300 cc. of boiling xylene to obtain 5-p-methoxyphenyl-1,2-dithiole-3-thione which is isolated as indicated in Example I and has the structural formula

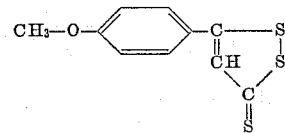

The yield is 11 grams and the thione melts at 109° C.

The yield is 52% with respect of the ketone starting material.

Example V 13 grams of sodium wire and 30 grams of tert-amyl-alcohol are introduced into a two-liter flask containing 500 cc. of dry benzene. The mixture is heated for two hours under reflux and, after cooling, the benzene solution is decanted, leaving excess sodium in the flask.

A mixture of 17 grams of cyclohexanone and 13 grams of carbon disulfide dissolved in 200 cc. benzene is progressively added to the sodium tert-amylate benzene solution. The reaction is exothermic and the sodium salt of the resultant dithio acid precipitates immediately. The mixture is allowed to stand for two hours and then water is added to dissolve the sodium salt. The aqueous layer is decanted, washed with ether and acidified with sulfuric acid in the presence of ice. The free dithio acid is then extracted with ether and the ether solution is washed with water and dried over calcium chloride. The ether is distilled off and there is obtained 30 grams of a red oil constituting the dithio acid corresponding to cyclohexanone and having the structural formula

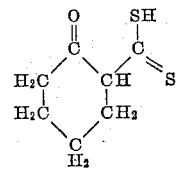

Without previous purifications, this acid is sulfurized by gradually adding a solution of this acid in 100 cc. of tetraline over a period of about an hour to a mixture of 300 cc. of tetraline and 50 grams of phosphorus pentasulfide heated at reflux. Heating is continued for about half an hour.

After cooling, an equal volume of ether is added and the resultant solution is washed with aqueous soda and then with an aqueous sodium chloride solution. A saturated solution of mercuric chloride in acetone is added until precipitation of the mercuric complex of the thione is completed. The precipitate is dried, washed with ether and then decomposed by an aqueous saturated sodium sulfide solution. The mixture is extracted with ether and the solvent is distilled off. Violet crystals melting at 98°–101° C. are obtained and are recrystalized from cyclohexane, orange crystals of 4,5,6,7-tetrahydro-1,2-benzo-dithiole-3-thione appear, which melt at 102° C. and have the structural formula

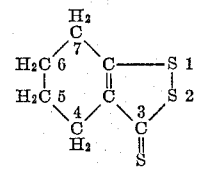

Sodium tert-butylate may be used instead of sodium tert-amylate in the condensation process.

Useful solvents include also toluene, xylene and tetraline.

What I claim is:

1. A process of preparing a 1,2-dithiole-3-thione by condensing carbon disulfide in the presence of an alkali metal alcoholate selected from the group consisting of sodium tert-butylate and sodium tert-amylate, with a ketone selected from the group consisting of acetone, acetophenone, p-methoxy-acetophenone, 3,3'-dimethyl-3-butanone and cyclohexanone, until there is formed a corresponding sodium salt of a compound selected from the group consisting of β-keto-dithio-carboxylic acids and β,β-dimercapto-α-ethylene-ketones, dissolving said sodium salt in water, acidifying the aqueous solution to obtain said compound, and sulfurizing the compound with phosphorus pentasulfide to obtain the corresponding 1,2-dithiole-3-thione.

2. The process of claim 1, wherein the condensation is effected in a single phase including benzene as a solvent.

3. The process of claim 1, wherein said sulfurization is effected in the presence of benzene as a solvent.

References Cited in the file of this patent

UNITED STATES PATENTS 2,493,071　　Kendall et al. _____ Jan. 3, 1950

FOREIGN PATENTS 1,052,014　　France _____ Sept. 23, 1953

OTHER REFERENCES

Kelber: "Ber. der Deut. Chem. Gesell.," vol. 43, pp. 1252-9 (1910).

Kelber et al.: Ibid., vol. 44 pp. 1693-700 (1911).

Luttinghaus et al.: Annalen, vol. 560, pp. 201-14 (1947).

Spindt et al.: Jour. Amer. Chem. Soc., vol. 73, pp. 3693-97 (1951).

Kelber: Ber., 1910, vol. 43, p. 1252.

Kelber et al.: Ber., 1911, vol. 44, p. 1698.

Kelber et al.: Ber., 1912, vol. 45, p. 137.